No. 841,394. PATENTED JAN. 15, 1907.
E. M. HARTMAN.
WING OPERATING MECHANISM.
APPLICATION FILED DEC. 5, 1905.
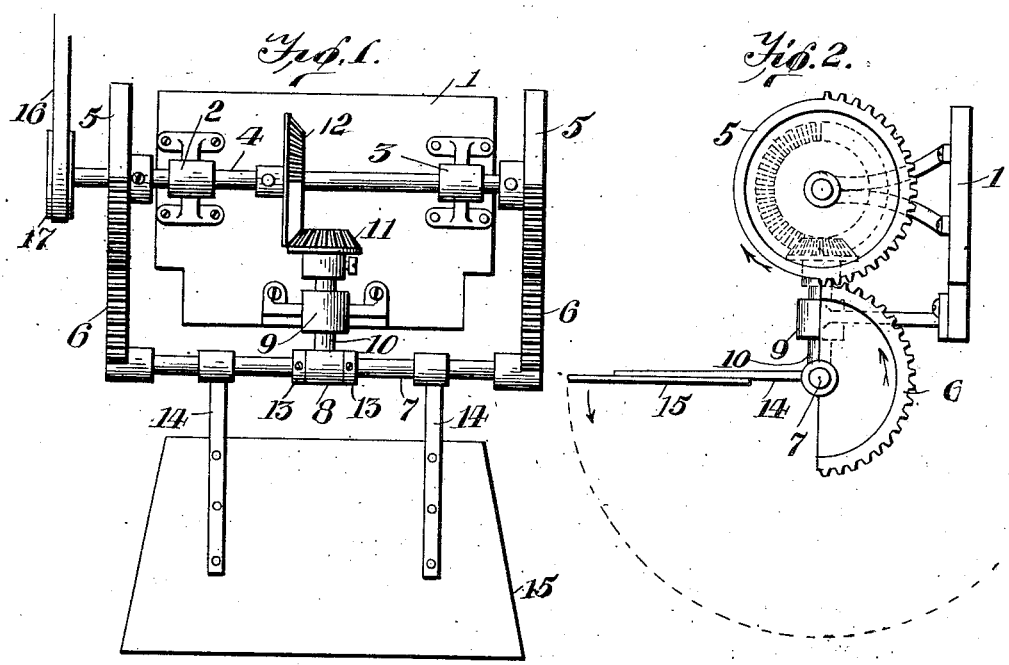
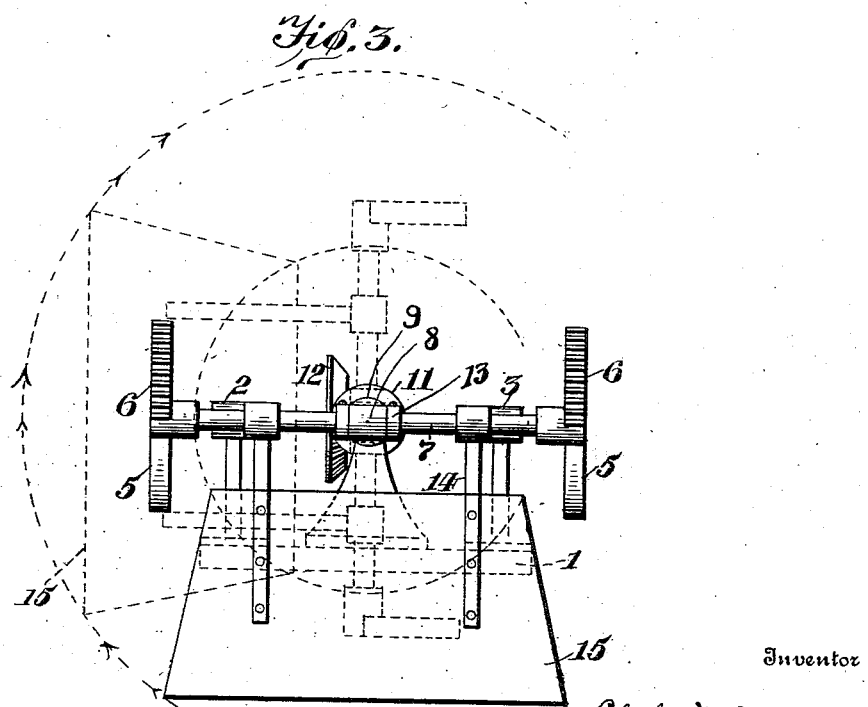
Witnesses
BM Offutt
George Oltsch
Inventor
Elisha M. Hartman
by Theodore Dalton
Attorney

UNITED STATES PATENT OFFICE.

ELISHA M. HARTMAN, OF SOUTH BEND, INDIANA.

WING-OPERATING MECHANISM.

No. 841,394.　　　　Specification of Letters Patent.　　　　Patented Jan. 15, 1907.

Application filed December 5, 1905. Serial No. 290,477.

*To all whom it may concern:*

Be it known that I, ELISHA M. HARTMAN, a citizen of the United States, residing at South Bend, in the county of St. Joseph and State of Indiana, have invented new and useful Improvements in Wing-Operating Mechanism, of which the following is a specification.

This invention relates to a wing-operating mechanism, and while more especially adapted for use upon a flying-machine it may be applied to other devices.

The object is to provide a mechanism for swinging a wing or blade in two directions— first, in a direction at right angles to its flat sides, so that it will offer as much resistance to a fluid as possible, and then in a direction parallel with its flat sides, so as to offer as little resistance as possible to a fluid, wherefore the wing is feathered.

With the above objects in view the invention embodies a wing which is connected with a shaft that is first rotated axially by suitable gearing so as to swing the wing against the resistance of the air, and at the completion of this first stroke the shaft, with its journal, is rotated on its transverse axis so as to feather the wing and restore it to its original position.

For a full understanding of the details of construction and the merits and advantages of my invention reference is to be had to the following description and to the accompanying drawings, in which—

Figure 1 is a plan view of the wing and its operating mechanism, the wing being in a position where it has made one-half of its stroke in its first movement. Fig. 2 is a side elevation with the wing shown in a position at the beginning of its downward stroke; and Fig. 3 is a front elevation with the parts shown in full lines as they appear at the completion of the first stroke of the wing and in dotted lines as they appear when the wing has partially returned to its position shown in Fig. 2, the orbit of the wing being indicated by the curved dotted lines.

Making renewed reference to the drawings, 1 designates a base or support for the driving mechanism of the wing, and this may constitute part of a flying-machine, or it may be secured to the latter. On this base are suitable bearings 2 and 3, in which is journaled a driving-shaft 4, on each end of which is a segmental gear 5. Each of the gears 5 meshes with segmental gears 6 on the ends of a shaft 7. The shaft 7 is journaled in a suitable bearing 8, from which extends a spindle 10, that is journaled in a bearing 9, fixed upon the base 1 near the edge thereof. On the inner end of this spindle 10 is a beveled gear 11, which meshes with a segmental beveled gear 12, fixed upon the driving-shaft 4 and having its teeth arranged so that they will be engaged with the beveled gear 11 when the teeth of the gears 5 are out of mesh with the teeth of the gears 6. The shaft 7 is held against endwise movement in its bearing 8 by means of suitable collars 13, which engage with opposite ends of the bearing 8. Fixed upon the shaft 7 are arms 14, to which a wing 15 is secured.

From the description thus far given it will be seen that when the driving-shaft 4 is rotated the gear-wheels 5 and beveled gearwheel 12 will also be rotated and that when the teeth of the gears 5 are engaged with the teeth of the segmental gear 6 the shaft 7 will be rotated on its longitudinal axis and cause the wing 15 to be moved in the direction indicated by the arrow in Fig. 2, wherein the wing is shown in an upright position at the beginning of its downward stroke, and as it moves downward the gears rotate in the direction indicated by the arrows, and the wing describes an arc of one hundred and eighty degrees from zenith to nadir. When it has reached the latter position, the teeth of the gears 5 and 6 are no longer in mesh; but the teeth of the segmental beveled gear 12 have now engaged the teeth of the beveled gear 11, and said gear, with its spindle 10, is caused to rotate in its bearing 9 and turn the shaft 7 on its transverse axis, causing the gears 6 to change positions from one side to the other. During this last-mentioned stroke the wing 15 is swung edgewise at right angles to its first stroke, and in Fig. 3 it is shown in full lines in the position it assumes when it has completed the first stroke, while the dotted lines indicate the position of the parts when the wing has moved to a position half-way between its lowest point and its highest point, its course being indicated by the arrows and the dotted lines.

It will be seen that the wing is first moved in the direction against the resistance of the air and then swung at right angles to its first stroke, so that its edge only encounters the resistance of the air, and at the completion of this last stroke the teeth of the gears 5 and 6 are again brought into mesh, while the teeth of the beveled gear 12 are out of mesh with the beveled gear 11.

The driving-shaft 4 is continuously rotated by any suitable means, preferably by a belt 16, mounted upon a pulley 17 on the end of said shaft.

Having thus described my invention, what I claim, and desire to secure by Letters Patent, is—

1. A wing-operating mechanism embodying a continuously-rotated driving-shaft, a counter-shaft, a wing connected to the counter-shaft, gearing for rotating the counter-shaft on its longitudinal axis to cause the wing to move against the resistance of the air, and gearing connecting the driving-shaft and the counter-shaft for swinging the counter-shaft on its transverse axis.

2. A wing-operating mechanism embodying a driving-shaft, a wing, means operated by said shaft for swinging the wing in a direction at right angles to its flat faces against the resistance of the wind, and means on said shaft for swinging the wing at right angles to its first movement, and in a plane parallel with its flat faces, whereby the wing is feathered.

3. A wing-operating mechanism embodying a continuously-rotated driving-shaft, segmental gears on said shaft, a segmental beveled gear on said shaft, a spindle disposed at right angles to the driving-shaft, a gear on said spindle adapted to mesh with the said segmental beveled gear, a counter-shaft journaled in said spindle, segmental gears on said counter-shaft adapted to mesh with the segmental gears on the driving-shaft, the teeth of the segmental gears of the driving-shaft being arranged to mesh with the teeth of the gears of the counter-shaft when the teeth of the segmental beveled gear are out of mesh with the gear on the spindle, and a wing connected to the said counter-shaft.

4. The combination with a wing or blade, of mechanism for swinging said wing in the arc of a circle at right angles to its flat sides, and mechanism for swinging the wing in the arc of a circle parallel with its flat sides to restore it to its original position.

In testimony whereof I affix my signature in presence of two subscribing witnesses.

ELISHA M. HARTMAN

Witnesses:
GEORGE OLTSCH,
G. M. COLE.